United States Patent [19]
Van Wyk et al.

[11] Patent Number: 5,581,466
[45] Date of Patent: Dec. 3, 1996

[54] TOLERANCE ANALYSIS SYSTEM AND METHOD

[75] Inventors: Dale L. Van Wyk, Parker; Paul J. Drake, Jr., Richardson, both of Tex.

[73] Assignee: Texas Instruments Incorporated, Dallas, Tex.

[21] Appl. No.: 241,544

[22] Filed: May 12, 1994

[51] Int. Cl.$^6$ .............................. G06F 19/00; G06F 17/00
[52] U.S. Cl. ................. 364/468.01; 364/474.24; 364/552; 364/554
[58] Field of Search ..................... 364/468, 469, 364/472, 552, 556, 560, 474.24, 400, 401, 554, 578, 551.01

[56] References Cited

U.S. PATENT DOCUMENTS

| | | | |
|---|---|---|---|
| 5,301,118 | 4/1994 | Heck et al. | 364/468 |
| 5,337,462 | 8/1994 | Hedman | 364/474.35 |
| 5,359,525 | 10/1994 | Weyenberg | 364/469 |

*Primary Examiner*—Paul P. Gordon
*Attorney, Agent, or Firm*—Robert L. Troike; Richard L. Donaldson

[57] ABSTRACT

A method of providing tolerancing of an assembly of parts comprising the steps of querying and storing in a processor storage a mean dimension of the parts of the assembly, a sensitivity for each mean dimension, a fixed tolerance for the parts for which the user cannot change and a standard deviation for which the user can change. The method further includes the step of processing said mean dimension, said sensitivity, said tolerances, and said standard deviation to provide projected defects per unit and directions to or other information to achieve design goals.

20 Claims, 7 Drawing Sheets

MECHANICAL TOLERANCE WORKSHEET

| ASSY NAME/PART#: | | | | | | | | PREPARED BY: | | | |
|---|---|---|---|---|---|---|---|---|---|---|---|
| INTERFACE DESC: | | | | | | | | DATE: 5-May-94 | | | |

| MEAN DIM. PLUS+ MINUS- | SENS | F/V | +/-TOL | RESIZED TOL | ALLOCATED +/-TOL | STANDARD DEVIATION | SIGMA | DRAWING# | REV | SH | ZN |
|---|---|---|---|---|---|---|---|---|---|---|---|
| | | | | | | | | | | | |
| | | | | | | | | | | | |
| | | | | | TOTALS | | ///// | ///// | ///// | ///// | ///// |
| | | | | | DPU= | | SIGMA= | | | | |

| UPPER SPEC LIMIT= | 0 |
| LOWER SPEC LIMIT= | 0 |

| METHOD USED (CHECK BOX) | WC ALLOC. | WC | MRSS |
| | STAT ALLOC. | RSS | ///// |
| | ///// | STAT ANALYSIS | |

MECHANICAL TOLERANCE WORKSHEET

ASSY NAME/PART#: Bearing Assembly  
INTERFACE DESC: Snap Ring to Bearing Cap  
PREPARED BY: Joe Engineer  
DATE: 5-May-94

| MEAN DIM. PLUS+ | MEAN DIM. MINUS- | SENS | F/V | +/-TOL | RESIZED TOL | ALLOCATED +/-TOL | STANDARD DEVIATION | SIGMA | DRAWING# | REV | SH | ZN |
|---|---|---|---|---|---|---|---|---|---|---|---|---|
|  | 0.0500 | -1 | f | 0.0050 |  |  |  |  |  |  |  |  |
| 0.1000 |  | 1 | v | 0.0200 | 0.0020 |  |  |  |  |  |  |  |
| 1.5000 |  | 1 | v | 0.0070 | 0.0007 |  |  |  |  |  |  |  |
|  | 0.0250 | -1 | v | 0.0010 | 0.0001 |  |  |  |  |  |  |  |
|  | 0.4500 | -1 | f | 0.0050 |  |  |  |  |  |  |  |  |
|  | 0.0250 | -1 | v | 0.0010 | 0.0001 |  |  |  |  |  |  |  |
|  | 0.5300 | -1 | v | 0.0200 | 0.0020 |  |  |  |  |  |  |  |
|  | 0.0250 | -1 | v | 0.0010 | 0.0001 |  |  |  |  |  |  |  |
|  | 0.4500 | -1 | f | 0.0050 |  |  |  |  |  |  |  |  |
|  | 0.0250 | -1 | v | 0.0010 | 0.0001 |  |  |  |  |  |  |  |
|  |  |  | TOTALS | 0.0660 | 0.0200 |  |  |  |  |  |  |  |

UPPER SPEC LIMIT = 0.0200  0.04  
LOWER SPEC LIMIT =         0

DPU=            SIGMA=

| METHOD USED (CHECK BOX) | WC ALLOC. | WC | X | MRSS |
|---|---|---|---|---|
|  | STAT ALLOC. | RSS |  |  |
|  | STAT ANALYSIS |  |  |  |

FIG. 7

MECHANICAL TOLERANCE WORKSHEET

ASSY NAME/PART#: Bearing Assembly
INTERFACE DESC: Snap Ring to Bearing Cap

PREPARED BY: Joe Engineer
DATE: 5-May-94

| MEAN DIM. PLUS+ | MINUS− | SENS | F/V | +/−TOL | RESIZED TOL | ALLOCATED +/−TOL | STANDARD DEVIATION | SIGMA | DRAWING# | REV | SH | ZN |
|---|---|---|---|---|---|---|---|---|---|---|---|---|
| 0.1000 | 0.0500 | −1 | f | 0.0050 | | | | | | | | |
| 1.5000 | | 1 | v | | | 0.0023 | 0.00037 | 6.18 | | | | |
| | | 1 | v | | | 0.0023 | 0.00037 | 6.18 | | | | |
| | 0.0250 | −1 | v | | | 0.0023 | 0.00037 | 6.18 | | | | |
| | 0.4500 | −1 | f | 0.0050 | | | | | | | | |
| | 0.0250 | −1 | v | | | 0.0023 | 0.00037 | 6.18 | | | | |
| | 0.5190 | −1 | v | | | 0.0023 | 0.00037 | 6.18 | | | | |
| | 0.0250 | −1 | v | | | 0.0023 | 0.00037 | 6.18 | | | | |
| | 0.4500 | −1 | f | 0.0050 | | | | | | | | |
| | 0.0250 | −1 | v | | | 0.0023 | 0.00037 | 6.18 | | | | |

TOTALS: 0.0310 / 0.0150 / 0.0160 / 9.7893E−04

UPPER SPEC LIMIT= 0.062
LOWER SPEC LIMIT= 0

| METHOD USED (CHECK BOX) | WC ALLOC. | X | WC | SIGMA= | MRSS |
|---|---|---|---|---|---|
| | STAT ALLOC. | DPU= | RSS | | |
| | | | STAT ANALYSIS | | |

FIG. 8

MECHANICAL TOLERANCE WORKSHEET

ASSY NAME/PART#: Bearing Assembly  
INTERFACE DESC: Snap Ring to Bearing Cap  
PREPARED BY: Joe Engineer  
DATE: 5-May-94

| MEAN DIM. PLUS+ | MINUS- | SENS | F/V | +/-TOL | RESIZED TOL | ALLOCATED +/-TOL | STANDARD DEVIATION | SIGMA | DRAWING# | REV | SH | ZN |
|---|---|---|---|---|---|---|---|---|---|---|---|---|
|  | 0.0500 | -1 | f | 0.0050 |  | 0.0022 | 0.00037 | 6.00 |  |  |  |  |
| 0.1000 |  | 1 | v |  |  | 0.0022 | 0.00037 | 6.00 |  |  |  |  |
| 1.5000 |  | 1 | v |  |  | 0.0022 | 0.00037 | 6.00 |  |  |  |  |
|  | 0.0250 | -1 | v | 0.0050 |  |  |  |  |  |  |  |  |
|  | 0.4500 | -1 | f |  |  | 0.0022 | 0.00037 | 6.00 |  |  |  |  |
|  | 0.0250 | -1 | v |  |  | 0.0022 | 0.00037 | 6.00 |  |  |  |  |
|  | 0.5300 | -1 | v |  |  | 0.0022 | 0.00037 | 6.00 |  |  |  |  |
|  | 0.0250 | -1 | v |  |  |  |  |  |  |  |  |  |
|  | 0.4500 | -1 | f | 0.0050 |  |  |  |  |  |  |  |  |
|  | 0.0250 | -1 | v |  |  | 0.0022 | 0.00037 | 6.00 |  |  |  |  |
|  |  |  |  |  |  |  |  |  |  |  |  |  |
| 0.0200 |  |  |  | 0.0150 |  | 0.0059 | 9.7893E-04 | TOTALS |  |  |  |  |

UPPER SPEC LIMIT = 0.04  
LOWER SPEC LIMIT = 0

Increase USL a minimum of 0.0009 for 6 sigma producibility (or reduce standard deviations)

| METHOD USED (CHECK BOX) | WC ALLOC. | WC | | |
|---|---|---|---|---|
|  | STAT ALLOC. | X | RSS | |
|  |  | STAT ANALYSIS | | |

DPU= 1.5462E-04  SIGMA= 5.11  MRSS

TOLERANCE ANALYSIS SYSTEM AND METHOD

STATEMENT OF THE INVENTION

This invention relates to tolerance analysis and more particularly to an automated analysis system and method.

BACKGROUND OF THE INVENTION

In traditional mechanical tolerance analysis, mechanical engineers and designers assign tolerances to dimensions and analyze the effectiveness of meeting performance requirements such as clearance around a module. It was an iterative process, with the number of steps determined by the skill of the engineer to define or modify the design. In addition, the tolerance chosen was based on perceptions the individual engineer possessed regarding the ability of machine tools to perform a particular operation, e.g., what is the best tolerance to apply to a part that will be machined on lathe?

In an effort for manufacturers to achieve higher quality, goals are set to have failure of parts down to certain limits. One such limited failure goal is called "Six Sigma" goal.

Known tolerancing software tools on the market or privately owned:

VSA (Variation Simulation Analysis)—Applied Computer Solutions;

CATS (Computer Aided Tolerancing Software)—
  Brigham Young University
  available with Autocad
  working on implementation with CATHA and others;

GEOS—Renssalaer Polytechnic Institute

Dimensional Management Software—Trikon

TI/TOL—Texas Instruments and BYU

Cognition

CATS has some form of Motorola Six Sigma capability. TI/TOL has some Six Sigma capability.

SUMMARY OF THE INVENTION

In accordance with one preferred embodiment of the present invention, an automated spreadsheet is provided that aids design engineers to assign tolerances to mechanical components and to predict their effect on the function of an assembly. The equations used in the system and method reduce the iterations required to choose dimensions and tolerances, and utilize process capability data to establish tolerances based on history, not perception. They are for one example focused on helping the engineer to achieve Six Sigma goals, and provide guidance about what could be changed in the design to meet these goals.

DESCRIPTION OF PREFERRED EMBODIMENT

Figure 1:
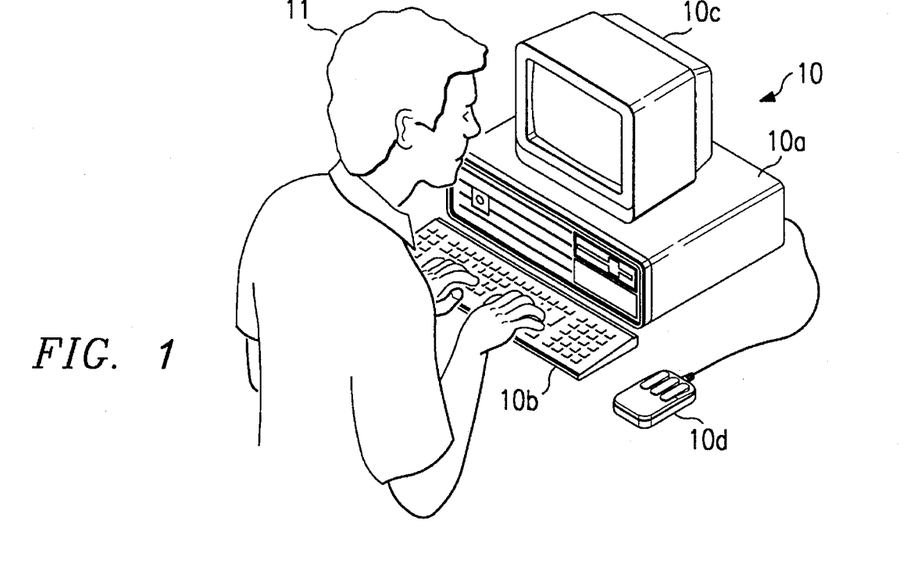
FIG. 1 is a system block diagram.

In accordance with one embodiment of the present invention, the system comprises a computer system as illustrated in FIG. 1, for example, including a processor 10a, with a keyboard 10b, a mouse 10d, and a screen or monitor 10c. The processor system 10a may include a floppy disk load system or a hard drive. In accordance with the present invention and a preferred embodiment, the system 10 uses an Excel spreadsheet, Version 4.0. The tolerance analysis spreadsheet is an Excel file, which is then loaded via a floppy disk, or hard drive, into the processor 10a. The worksheet file (template) that performs basic tolerance analysis for one dimensional stack-ups. This tool is a generic tool that can quickly and efficiently assign mechanical tolerances for simple models. The tool has six major functions:

Classical tolerance analysis (1) Worst Case Analysis (2) Root Sum of Squares (RSS) Analysis (3) Modified RSS Analysis The classical models feature a "resizing" function that directly calculates the tolerances required to meet traditional performance goals (as opposed to several iterations to get the answer). The system also includes a Six Sigma tolerance allocation/analysis with (4) Worst Case Allocation (5) Statistical Allocation (6) Statistical Analysis The Six Sigma models assign and evaluate tolerances based on capabilities of the processes that are used to make the parts. These models automatically assign tolerances so that each component is equally producible. The spreadsheet also calculates an estimate of the assembly defect rate that will occur.

Advantages:

1) This tool gives the user 11 several analysis or allocation options at the click of a mouse as illustrated at 10d.

2) The user 11 can get an estimate of defect data by taking advantage of process capabilities instead of choosing a traditional method which relied on user expertise.

3) Automatically resizes tolerances if one of the classical methods is used.

4) Automatically allocates tolerances if one of the Six Sigma methods is used.

5) Includes both fixed and variable inputs to accommodate purchased and internally fabricated parts.

6) Allows for any sensitivity value, not just +/−1.

7) Output is the form of handy worksheet for future reference.

8) Provides guidance to meet Six Sigma productivity and performance goals.

9) Calculates an estimate of the defect rates for assemblies.

Figure 2:
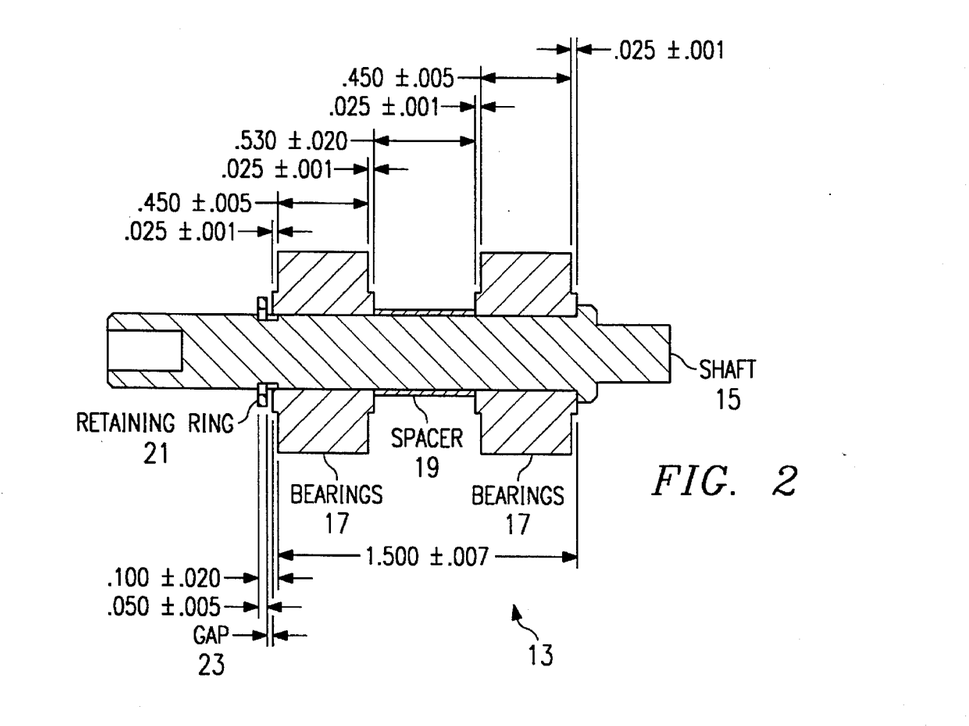
FIG. 2 illustrates a bearing assembly for which the present design provides analysis.
Figure 3:
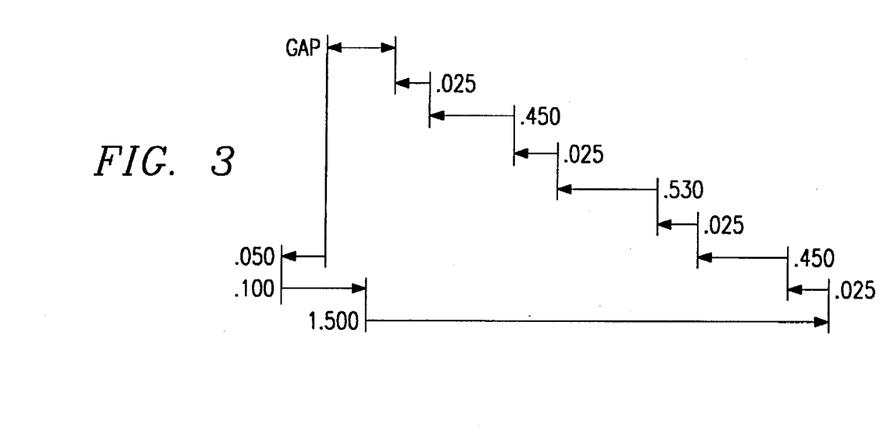
FIG. 3 is a sketch of the bearing assembly mean dimensions.

Referring to FIG. 2, for example, a bearing assembly 13 is illustrated with indicated tolerances. A sketch of the mean dimensions is shown in FIG. 3. The bearing assembly comprises the following parts: (a shaft 15, two bearings 17, a spacer 19, and a retaining ring 21). In accordance with the present invention, an auto tolerancing spreadsheet, or worksheet, is created using, for example, Excel Spreadsheet Version 4.0. The fields have the layout shown in FIG. 4. Table 1 below is a description of the six models solved on by the spreadsheet. The description is with respect to solving the gap marked in FIG. 2.

TABLE 1

| Model Name | Description | Notes |
|---|---|---|
| Worst Case (WC) | Range at the gap is considered to be equal to the numeric sum of all the tolerances of the included dimensions. | Simplest and most conservative of traditional approaches. |
| Root Sum of Squares (RSS) | Range at the gap is considered to be equal to the square root of the sum of the squares of all the tolerances in the stack-up. | Least conservative of traditional approaches. |
| Modified Root Sum of Squares (MRSS) | Range at the gap is considered to be equal to the RSS value times a correction factor. | More conservative than RSS, but less than Worst Case. |

A resize feature is included for each of the above models that will modify tolerances so that the total will equal the nominal gap for whichever of the three models is chosen. Each tolerance is increased by the same factor so that relative productivity of every dimension will be preserved.

| Worst Case Allocation (WC ALLOC) | A technique that uses available standard deviations to assign tolerances to each dimension. The tolerances are assigned so that each will be equally producible (same Sigma). A value is provided as a guideline as to what should be changed to meet Six Sigma guidelines. | Assembly is assured with worst case combinations of tolerances, and each tolerance will have a Sigma of a least 6.0. |
| Statistical Allocation (Stat ALLOC.) | Is similar to RSS model. Tolerances are assigned to each dimension so that it has a Sigma of 6.0. The expected defects per unit (DPU) and Sigma of the gap is provided. | If the assembly does not meet Six Sigma requirements, a value is provided as a guideline to improve the design. |
| Statistical Analysis (STAT ANALYSIS) | This is used on designs that already have tolerances assigned, but a DPU and Sigma of the gap is desired. | It provides a guideline as to what can be changed to achieve Six Sigma interchangeability at the gap. |

Figure 4:
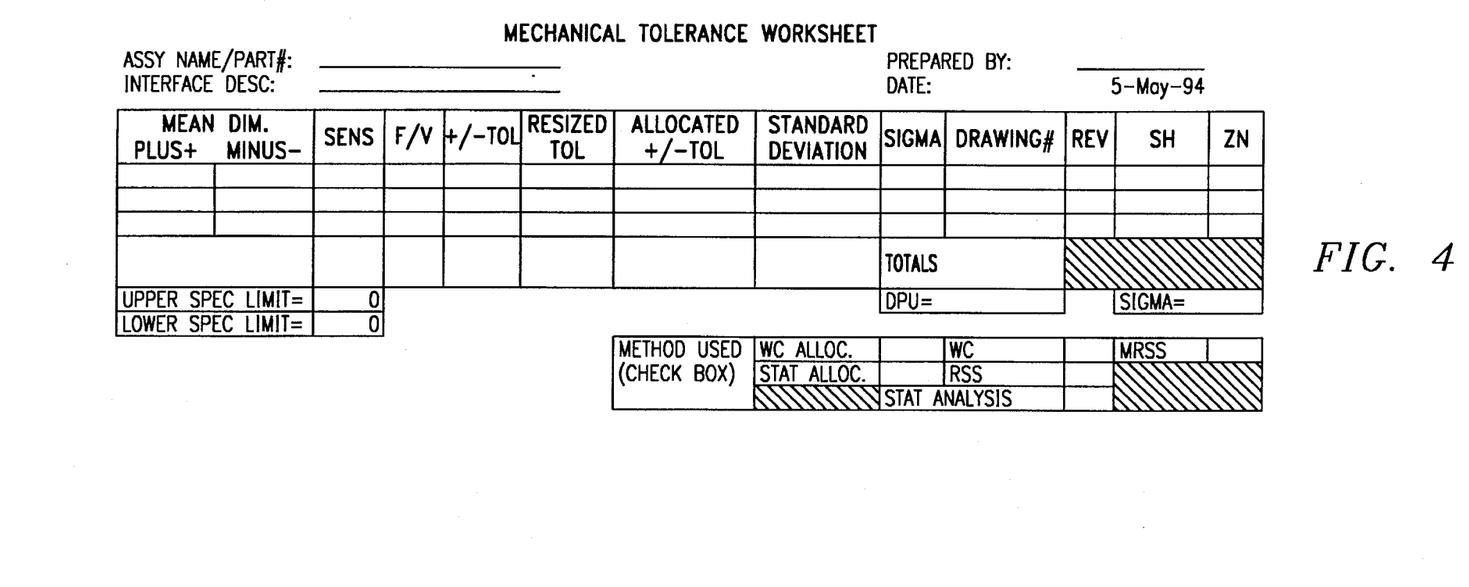
FIG. 4 illustrates the fields of the spreadsheet.

The mechanical tolerancing worksheet fields of FIG. 4 are defined as charted below in Table 2:

TABLE 2

| Fields | Definitions |
|---|---|
| ASSY NAME/ PART # | Name of assembly or part number. |
| PREPARED BY: | Yourself |
| INTERFACE DESC | Description of the assembly tolerance stackup to be analyzed. |
| DATE | Date you perform the analysis. It is automatically updated by the computer, or can be altered by user. |
| MEAN DIM | The mid-dimension of the tolerance limits |
| PLUS + | Positive dimensions follow from left to right (or bottom to top) on the loop diagram. Enter as positive numbers. |
| MINUS − | Negative dimensions follow from left to right (or bottom to top) on the loop diagram. Enter as positive numbers. |
| SENS | Sensitivity is a factor that defines direction and magnitude for a dimension. Sensitivities are entered as positive numbers for "plus" mean dimensions, and as negative numbers for |

TABLE 2-continued

| Fields | Definitions |
|---|---|
| | "minus" mean dimensions. Example: A diameter term may be modified by −0.5 to indicate that a radius is a negative contributing factor in the stackup. |
| F/V | Fixed or Variable tolerance. F is a fixed input, such as a vendor part dimension. The user cannot change these inputs. V is a variable input. The user can change these inputs. |
| +/− TOL | This is the equal bilateral tolerance that the user assigns to each dimension when using the WC, RSS, or MRSS method of analysis. |
| RESIZED TOL | This is the dimension tolerance that will give a gap performance equal to, the sum of the positive mean dimensions, minus the sum of the negative mean dimensions, minus the distance to the nearest spec. limit. using the WC ALLOC or STAT ALLOC method. |
| STANDARD DEVIATION | A number that is a measure of the dispersion of the actual values of the variable from the menu. |
| SIGMA | A measure of the width of a process distribution as compared to the specification limits. there are two Sigma on the spreadsheet. Cell I7 (next to STANDARD DEVIATION) refers to the Sigma for each tolerance. Cell M31 (under SH and ZN columns) refers to the Sigma for the assembly. |
| DRAWING # | The drawing from which the dimension and tolerance are obtained. |
| ZN | The zone reference number and letter on the drawing where you find the dimension and tolerance. |
| UPPER SPEC LIMIT | This is the largest gap that the user will allow. Default is zero. |
| LOWER SPEC LIMIT | This is the smallest gap that the user will allow. The default is zero. |
| TOTALS | The first box (under Mean Dim) is the sum of each dimension multiplied by its sensitivity. The totals under the "+/− TOL", the "RESIZED TOL", and the "ALLOCATED +/− TOL" columns are the expected ranges using the method selected. |
| DPU | Defects Per Unit. The average number of defects that is expected to be found during assembly. |
| METHOD USED | The method used to perform the analysis/ allocation. These are listed below. |
| WC ALLOC | Check this box if you want to allocate tolerance based on 100% interchangeability. This method will calculate the Sigma for each piece part, given process standard deviations. WC ALLOC |
| STAT ALLOC | Check this box if you want to allocate tolerances based on probability. This method will calculate the Sigma and DPU for the assembly, given process standard deviations. This method will also assign a dimension tolerance based on a Sigma of 6.0. |
| WC | Check this box if you want to do a worst case analysis based on 100% interchangeabiltiy. |
| RSS | Check this box if you want to do a statistical analysis based on the Root Sum of Squares method. |
| STAT ANALYSIS | Check this box if you want to calculate the assembly DPU and Sigma. |
| MRSS | Check this box if you want to do a statistical analysis based on the Modified Root Sum of Squares method. |

Methods of analysis/allocation

There are six methods of analysis and allocation calculated by this spreadsheet. The first three methods of Worst Case, Root Sum of Squares, and Modified Sum of Squares follow one procedure. The last three methods, Statistical Analysis, Worst Case Allocation, and Statistical Allocation, follow the second procedure. Throughout both procedures, the spreadsheet by embedded logic will prompt the user for needed information.

First Procedure

This procedure is used for Worst Case, Root Sum of Squares, and Modified Sum of Squares as illustrated in Table 3.

TABLE 3

| Step | What to do |
|---|---|
| 1. | Choose the method of analysis you want to perform. |
| 2. | Input mean dimensions. |
| 3. | The spreadsheet will prompt you for sensitivities. You can input these after you are finished with the dimensions. |
| 4. | Input +/− tolerances. The spreadsheet will prompt as to whether the tolerances are Fixed or Variable (F/V). Spreadsheet will NOT resize fixed tolerances. |
| 5. | Change upper spec limit and lower spec limit as needed. Value will default to zero. |

Depending on the method used, you will get the results in Table 4:

TABLE 4

| Method | Results Calculated |
|---|---|
| Worst Case (WC) | WC Tolerances |
| | Resized Tolerances |
| | Nominal gap |
| Root Sum of Squares (RSS) | RSS totals |
| | Resized Tolerances |
| | Nominal gap |
| Modified RSS | RSS totals |
| | Resized Tolerances |
| | Nominal gap |

Second Procedure

This procedure is used for Statistical Analysis, Worst Case Allocation, and Statistical Allocation as indicated in Table 5 below.

TABLE 5

| Step | What to do |
|---|---|
| 1. | Choose the method of analysis you want to perform. |
| 2. | Input mean dimensions. |
| 3. | The spreadsheet will prompt you for sensitivities. You can input these after you are finished with the dimensions. |
| 4. | The spreadsheet will prompt as to whether the tolerances are Fixed or Variable (F/V). If V, input the standard deviation. If F, input +/− tolerances. |

Depending on the method used, you will get the indicated results in Table 6:

TABLE 6

| Method | Results Calculated | Notes |
|---|---|---|
| Statistical Analysis | DPU Sigma | |
| Worst Case Allocation | Allocated +/− Tol Sigma | |
| Statistical Allocation | DPU Sigma Allocated +/− Tol | Assigns Allocated Tol so that Sigma = 6.0 for each dimension |

Error Messages

The error messages are indicated in Table 7 below:

TABLE 7

| Message | Meaning |
|---|---|
| RSS not recommended for <4 dimensions | This message warns the user that he/she should not use the RSS method if there are fewer than four dimensions in the stackup. |
| MRSS not recommended for <4 dimensions | This message warns the user that he/she should not use the MRSS method if there are fewer than four dimensions in the stackup. |
| Fixed tolerances > gap, WC resizing will not work | This message appears in the WC mode if the fixed tolerances use up all of the tolerance that is available to allocate. Example: You are performing a worst case analysis. You have .04 to allocate. You have two fixed tolerances (.03 and .04). Since the expected range of the fixed tolerances is .07, the variable tolerances cannot be "resized" to give a total tolerance equal to .04. |
| Fixed tolerances > gap, RSS resizing will not work | This message appears in the RSS mode if the fixed tolerances use up all of the tolerance that is available to allocate. Example: You are performing an RSS analysis. You have .04 to allocate. You have two fixed tolerances (.03 and .04). Since the expected range of the fixed tolerances is .05, the variable tolerances cannot be "resided" to give a total tolerance equal to .04. |
| Choose only one method | This message appears if you select more than one method of analyzing/allocating tolerances. Deselect one method to get rid of error message. |
| There must be a number in both spec limit boxes | This message appears if there is not a value in cells C31 and C32 (under the Sens column). The default value is zero. |
| Increase (Decrease) USL (LSL) a minimum of __ for Six Sigma productivity (or reduce standard deviations) | Using the worst case allocation method, this message appears if any of the dimensions have a Sigma of less than 6.0. Using the statistical allocation method or the statistical method, this message appears if the assembly Sigma is less than 6.0. The user can achieve a Sigma of 6.0 by adjusting the mean or spec limit by the amount shown. The user can adjust the mean gap by increasing/decreasing one or more mean dimensions. If this is not possible, the user can achieve a high Sigma by choosing processes with smaller standard deviations. |
| Fixed tolerances > gap, MRSS residing will not work | This message appears in the MRSS mode if the fixed tolerances use up all of the tolerance that is available to allocate. Example: You are performing an MRSS analysis. You have .04 to allocate. You have two fixed tolerances (.03 and .04) and three variable tolerances (.02, .02, and .02). Since the expected range of the fixed tolerances is .058, the variable tolerances cannot be "resided" to give a total tolerance equal to .04. |

Figure 5A:
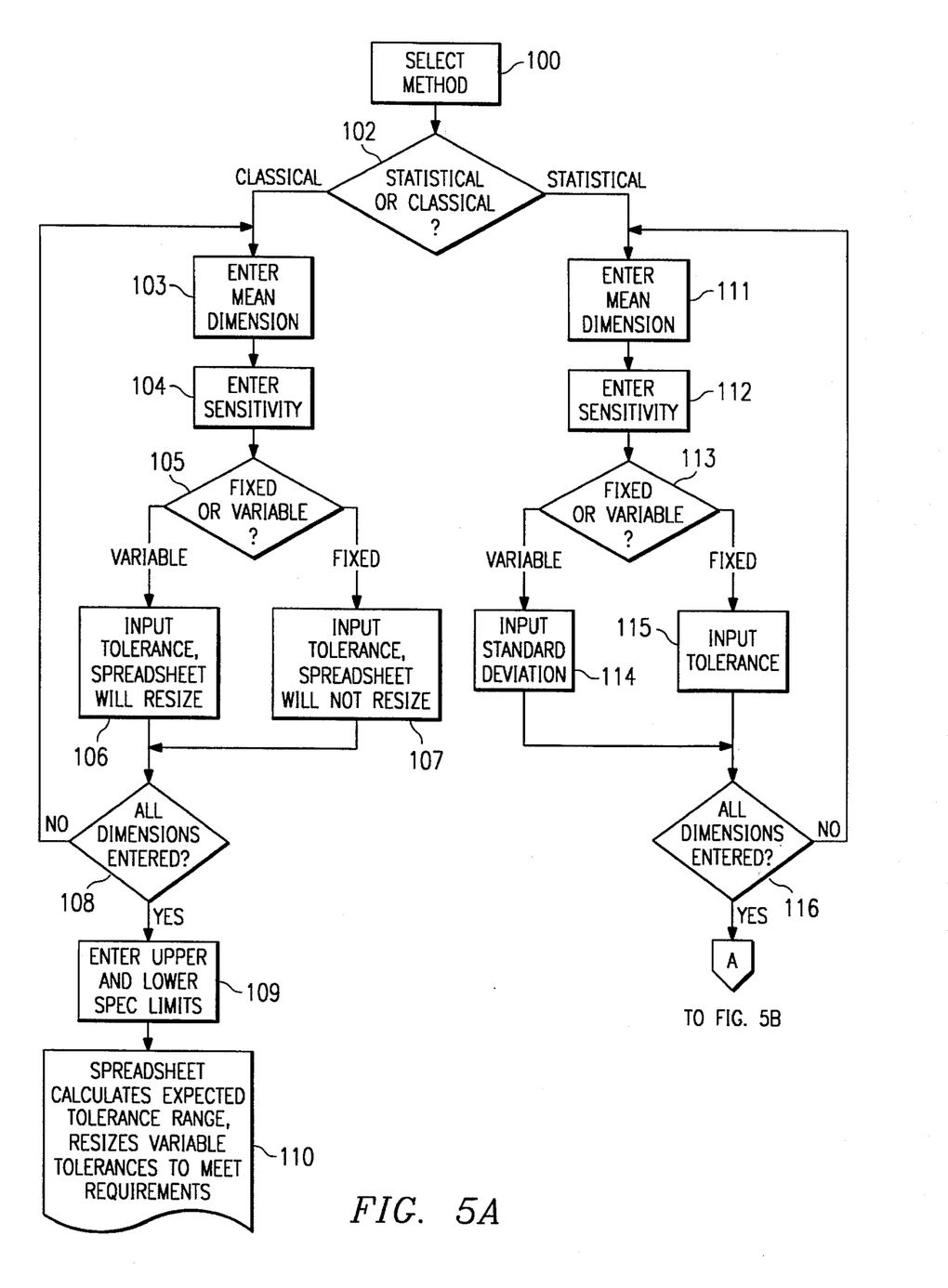
FIG. 5A and 5B are flow charts of the logic of the system and method.
Figure 5B:
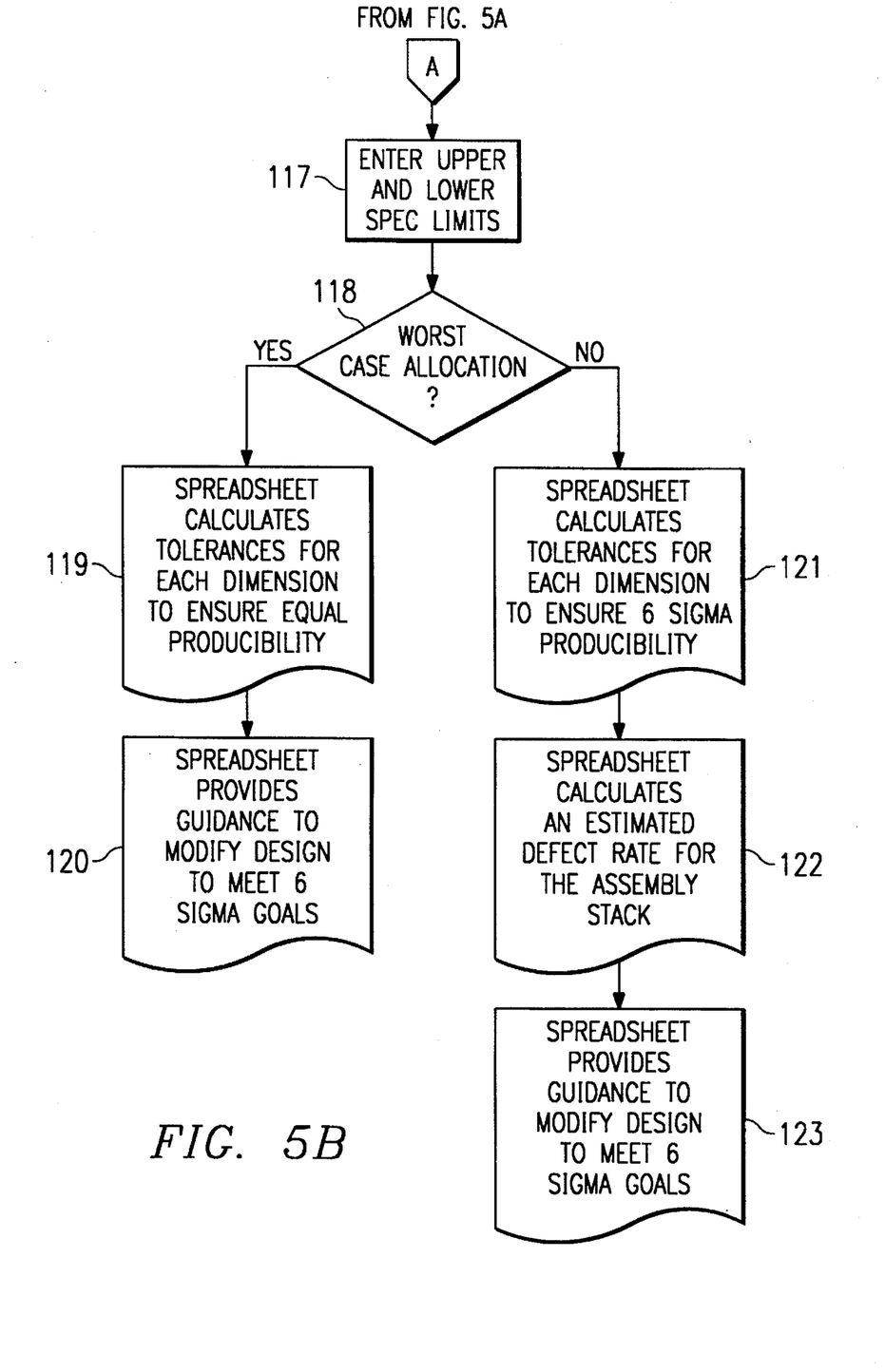
Figure 6:
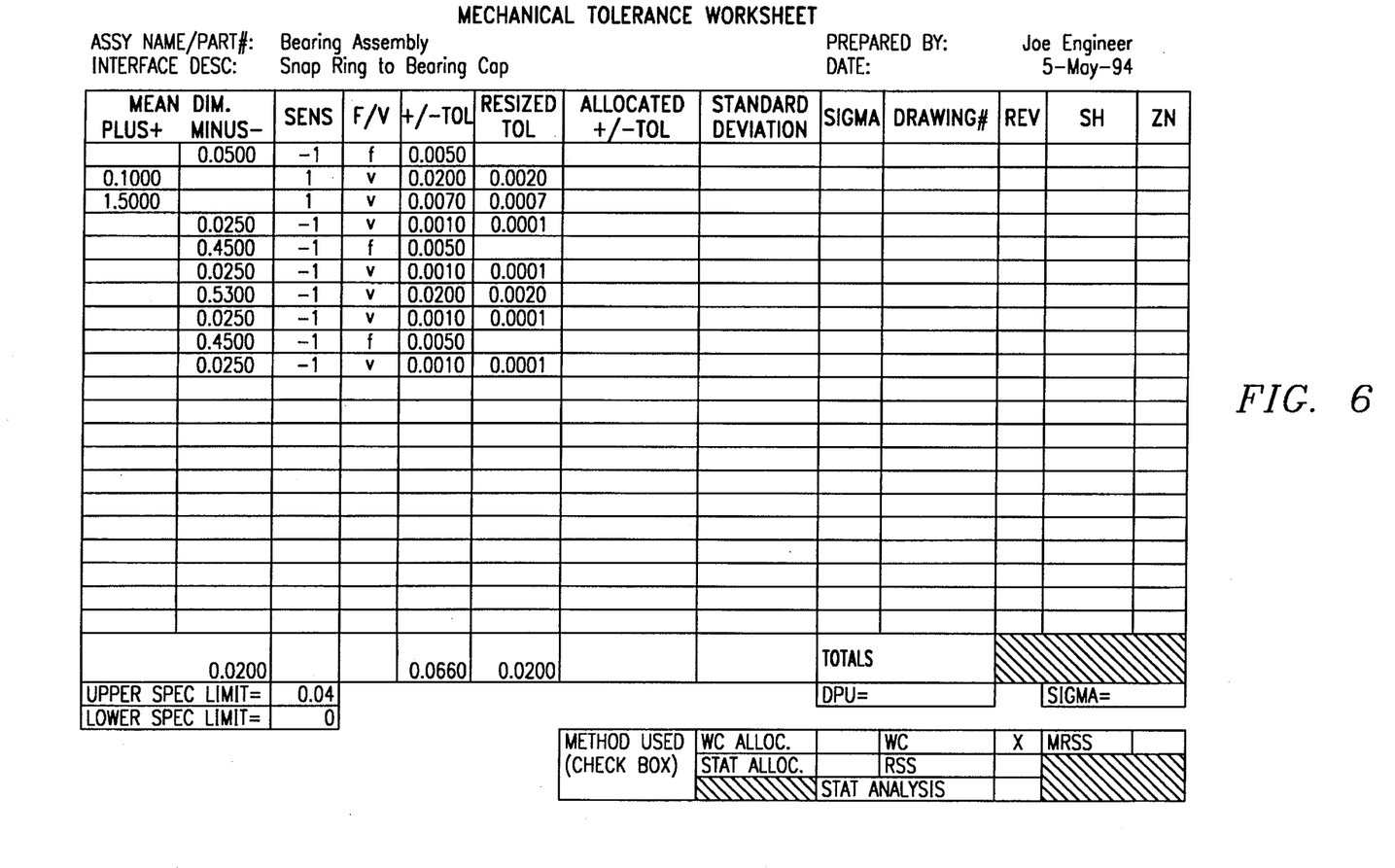
FIG. 6 illustrates the spreadsheet with the mean dimensions, sensitivity, and tolerances for performing a Classical method of analysis and resizing.

In accordance with one embodiment of the present invention, embedded logic is placed in the spreadsheet. The system could be implemented in a conventional Fortran or C program. In either case, the system would follow the logic of the flow chart of FIG. 5. In the case of the spreadsheet, this is by placing an x next to WC, RSS, MRSS, WC ALLOC., STAT ALLOC. or STAT. ANALYSIS in FIG. 4. The user inputs the method of analysis (Step 102) as indicated in the flow chart of FIG. 5. The mean dimensions are then queried and entered by the user (Step 103) for each mean dimension. The query may be started by an "IF" statement in response to an x in one of the squares listed above. The sensitivity is prompted by the logic (Step 104) in response to the mean dimensions, and then also the Fixed (F) or Variable (V) tolerances are prompted (Step 105). FIG. 6 illustrates in columns 1 and 2 the mean dimensions entered for the assembly of FIG. 2 in response to WC selected. Columns 3, 4, and 5 indicate the sensitivity, the F/V, and the ±TOL inputs where fixed (F), represents the tolerance of the vendor part and V, or Variable, are those that can be changed by the user. The fixed are those the spreadsheet will not resize and the variable are those the user can resize. For classical analysis (WC, RSS or MRSS selected), the logic will then ask for upper and lower spec limits (Step 109) as represented in FIG. 5 and entered at the lower left of FIG. 6, and then based on the selected analysis of Worst Case (WC) will (Step 100) calculate WC tolerances using $$T_{wc} = \sum_{j=1}^{n} s_j \cdot T_j$$

where n=the number of dimensions in the stack;

j=the tolerance of the jth dimension;

$T_j$=the tolerance of the jth dimension in the stack; and $S_j$=the sensitivity factor denoting magnitude and direction impact of the jth dimension in the stack.

$T_{WC}$ gives expected tolerance range using the worst case method. Root Sum of Squares (RSS) total using:

$$T_{RSS} = \sqrt{\sum_{j=1}^{n} (s_j \cdot T_j)^2}$$

$T_{RSS}$ gives the expected tolerance range using the root sum of squares method, or modified RSS totals using:

$$T_{MRSS} = C_f \sqrt{\sum_{j=1}^{n} (s_j \cdot T_j)^2}$$

where $C_f$ is the correction factor.

$T_{MRSS}$ gives the expected tolerance range using the modified root sum of squares method. The value $C_f$ is calculated first according to the following equation.

$$C_f = \frac{.5 \sum_{j=1}^{n} s_j T_j - \sum_{j=1}^{n} (s_j T_j)^2}{\sum_{j=1}^{n} (s_j T_j)^2 (\sqrt{n} - 1)} + 1$$

The design goal or performance requirement P is the minimum of $U_G$–LSL (lower spec. limit) or USL (upper spec. limit)–$U_G$. $U_G$ is the mean value of the performance parameter and is calculated by:

$$U_G = \sum_{j=1}^{n} (s_j \cdot U_j)$$

where $U_j$ is the mean value of the jth dimension

The resize tolerance j·th dimension or $T_{j,rs}$ is determined by F·$T_j$ where F is the resize factor. The resize factor (F) equation for resize for worst case is:

$$F = \frac{P - \sum_{j=1}^{k} s_j \cdot T_{j,f}}{\sum_{j=1}^{n} s_j \cdot T_j}$$

where $T_{j,f}$ is the fixed tolerance and k is the number of fixed tolerances in the stack.

The resize factor (F) equation for RSS is:

$$F = \sqrt{\frac{P^2 - \sum_{j=1}^{k} (s_j \cdot T_{j,f})^2}{\sum_{j=1}^{m} (s_j T_{j,v})^2}}$$

where $T_{j,v}$ is the variable tolerance.

The resize factor for modified RSS uses equation $$F = \frac{-b - \sqrt{b^2 - 4 \cdot a \cdot c}}{2a}$$

where $$a = 0.25 \cdot \sum_{j=1}^{m} (s_j \cdot T_{j,v}) - 2.25 \cdot \sum_{j=1}^{m} (s_j \cdot T_{j,v})^2 +$$

$$3 \cdot \sqrt{n} \cdot \sum_{j=1}^{m} (s_j \cdot T_{j,v})^2 - n \cdot \sum_{j=1}^{m} (s_j \cdot T_{j,v})^2$$

$$b = 0.5 \cdot \sum_{j=1}^{m} (s_j \cdot T_{j,v}) \sum_{j=1}^{k} (s_j T_{j,f}) + P \cdot \sum_{j=1}^{m} (s_j \cdot T_{j,v}) -$$

$$P \cdot \sqrt{n} \cdot \sum_{j=1}^{m} (s_j \cdot T_{j,v})$$

$$c = 0.25 \cdot \left( \sum_{j=1}^{k} s_j \cdot T_{j,f} \right)^2 + P^2 - 2P^2 \cdot \sqrt{n} + nP^2 +$$

$$P \sum_{j=1}^{k} (s_j \cdot T_{j,f}) - P \sqrt{n} \sum_{j=1}^{k} (s_j \cdot T_{j,f}) - 2.25 \sum_{j=1}^{k} (s_j \cdot T_{j,f})^2 +$$

$$3 \sqrt{n} \sum_{j=1}^{k} (s_j \cdot T_{j,f})^2 - n \sum_{j=1}^{k} (s_j \cdot T_{j,f})^2$$

The embedded program for these solutions would look to the pertinent fields and given input and calculate the solution and put that in the appropriate fields for the worksheet. Resizing is automatically done and the resize factor (F) equation is applied and the resized value placed in the appropriate resized field in the "RESIZED TOL" column (column 6 on the left) in FIG. 6. Note resized in FIG. 6 is for WC or worst case.

When the user 11 selects as the method of analysis to be the statistical method of analysis (Step 102) as indicated by the right portion of the flow chart of FIG. 5, again the input mean dimensions are prompted and entered (Step 111) as shown in Table 5 and the spreadsheet prompts for the sensitivities (112) and for the fixed or variable tolerances (Step 113). The fixed tolerances are those predetermined as by vendor parts. For the variable tolerances, the standard deviations (Step 114) as determined by historical data are entered in the eighth column from the left. This is a measure of the dispersion of the actual values of the variable. When all mean dimensions are entered, the screen prompts by way of the embedded program to request the user to supply the upper and lower spec limits (Step 117). If the selected field is worst case allocation, then for each of the dimensions in the stack the tolerance $T_j$ is determined by the equation:

$$T_j = \frac{\left( P - \sum_{j=1}^{k} (s_j \cdot T_{j,f}) \right) \sigma_j}{\sum_{j=1}^{k} (s_j \cdot \sigma_j)}$$

where $\sigma_j$=process standard deviation of the jth dimension of the stack. This is entered at the appropriate $T_j$ field in the column called "Allocated +/–TOL." This may be done by an embedded program for that field on the worksheet with the equation stated above. Guidance for Six Sigma goals are achieved using the equation:

$$\Delta_{wc} = 6 \sum_{j=1}^{m} (s_j \cdot \sigma_j) - \left( P - \sum_{j=1}^{k} (s_j \cdot T_{j,f}) \right)$$

Figure 7:
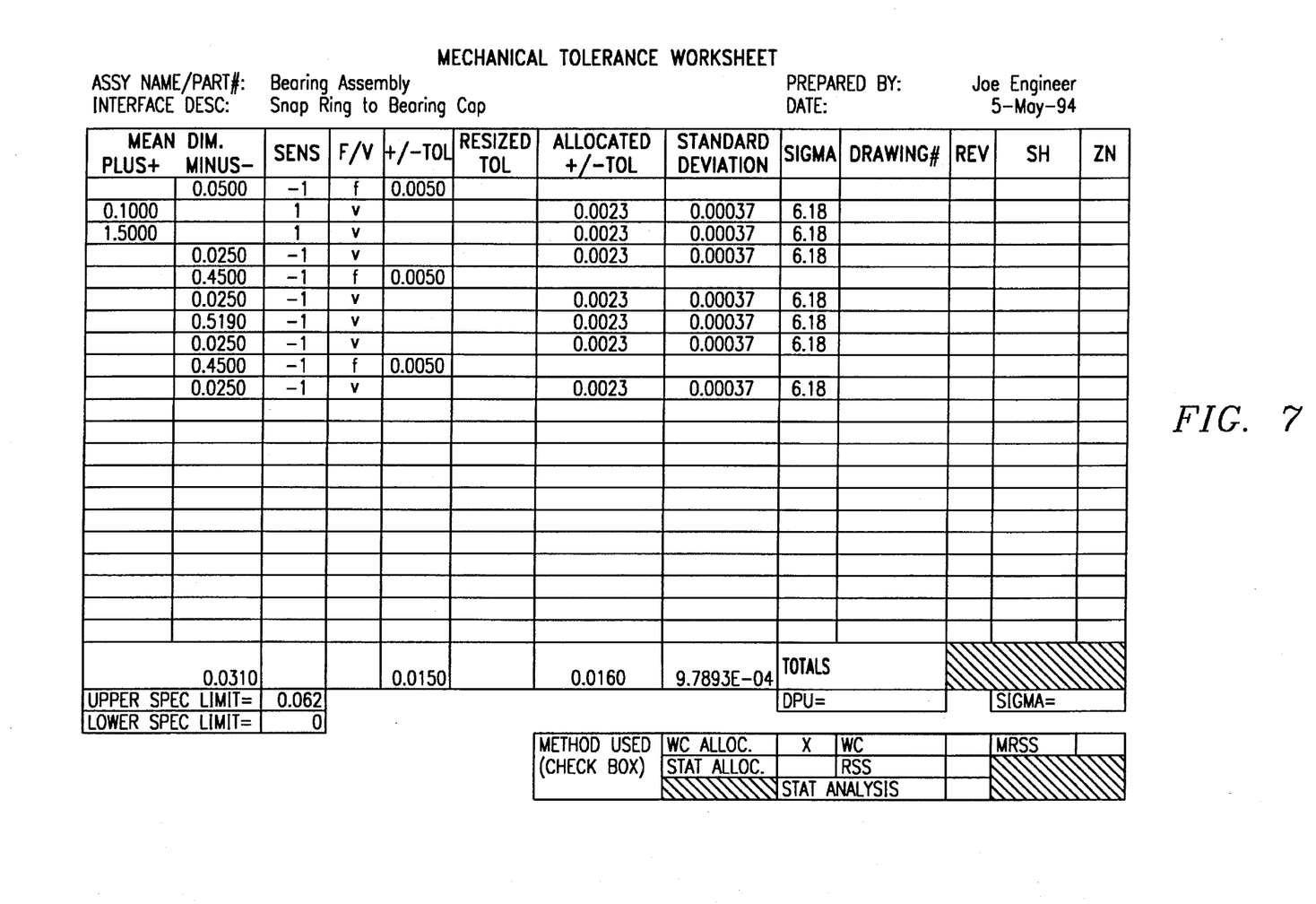
FIG. 7 illustrates the spreadsheet with mean dimension, sensitivity, tolerance and standard deviation for performing statistical method of analysis.

FIG. 7 illustrates for WC allocation and gives Sigma for each piece part given process standard deviations. Sigma is a measure of the width of a process distribution as compared to the specification limits. The Sigma, or field column, refers to the Sigma for each tolerance. The cell at the lower right labeled Sigma refers to the Sigma for the entire assembly.

Figure 8:
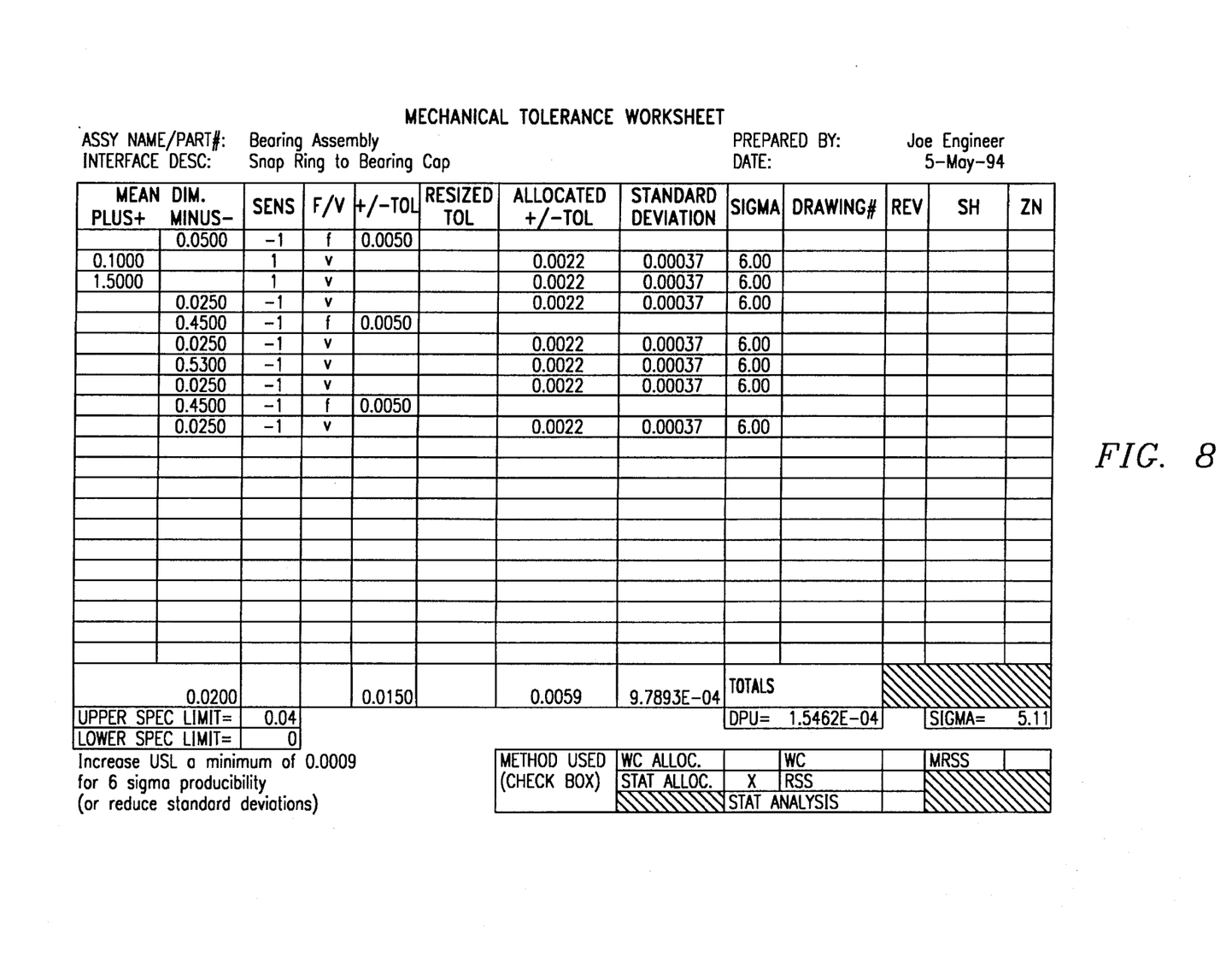
FIG. 8 illustrates the spreadsheet with calculated DPU.

FIG. 8 illustrates the calculated DPU (Defects Per Unit), which for the example calculates 1.5462E04 and when compared to nearer specification limit suggest increasing the upper specification limit a minimum of 9E-04, or reduce standard deviations.

The above is for when there is not the worst case allocation, but is operated on the statistical allocation and using the equation of $T_j = 6\sigma_j$ to calculate the tolerance for each dimension to ensure Six Sigma productivity for DPU:

$$DPU = (((((((1+0.049867347 * Z_{LT}) + 0.0211410061 * Z_{LT}^2 + 0.0032776263 * Z_{LT}^3 + 0.00003870036 * Z_{LT}^4) + 0.00004889606 * Z_{LT}^5) + 0.000005383 * Z_{LT}^6)^{-16}/2$$

The short term $Z_{ST}$ and long term $Z_{LT}$ standard transform is calculated using the equation:

$$Z_{ST} = \frac{\left( P - \sum_{j=1}^{k} S_j \cdot T_{j,f} \right)}{\sqrt{\sum_{j=1}^{m} (s_j \cdot \sigma_j)^2}}$$

$$Z_{LT} = Z_{ST} - 1.5$$

The spreadsheet guidance to modify the design is given by the equation:

$$\Delta_{st} = 6 \sqrt{\sum_{j=1}^{m} (s_j \cdot \sigma_j)^2} - \left( P - \sum_{j=1}^{k} (s_j \cdot T_{j,f}) \right)$$

What is claimed is:

1. A method of achieving a given maximum failure goal for an assembly of parts comprising the steps of:

storing in a storage of a computer system operating under program control first electrical signals representing a mean dimension for each of the parts of the assembly, a sensitivity for each menu dimension, a fixed tolerance for the parts of the assembly for which the user cannot change, a standard deviation for those parts for which the user can change, and upper and lower specification limits;

processing in a processor of said computer system under program control said first electrical signals representing mean dimensions, said sensitivity, said fixed tolerance, said standard deviations, and said upper and lower specification limits to provide second electrical signals representing modifications to said parts and assembly when needed to achieve desired maximum failure goal, and changing said parts and assembly on a display based on said second electrical signals representing modifications.

2. The method of claim 1 wherein said processing is based on worst case allocation.

3. The method of claim 2 wherein said processing is according to $$\Delta_{wc} = 6 \sum_{j=1}^{m} (s_j \cdot \sigma_j) - \left( P - \sum_{j=1}^{k} (s_j \cdot T_{j,f}) \right)$$

where $s_j$=sensitivity factor of the jth dimension in a stack;

$\sigma_j$=process standard deviation of the jth dimension in the stack;

k=the number of fixed tolerances in the stack;

P=performance requirement;

$T_{j,f}$=fixed tolerance; and m=number of variable tolerances in stack.

4. The method of claim 2 wherein said processing calculates tolerances for each dimension to ensure equal productivity.

5. The method of claim 1 wherein said processing is according to statistical allocation.

6. The method of claim 5 wherein said processing is according to $$\Delta_{st} = 6 \sqrt{\sum_{j=1}^{m} (s_j \cdot \sigma_j)^2} - \left( P - \sum_{j=1}^{k} (s_j \cdot T_{j,f}) \right)$$

where m=number of variable tolerances in stack;

$s_j$=sensitivity factor of the jth dimension in the stack;

$\sigma_j$=process standard deviation of the jth dimension in the stack;

$T_{j,f}$=fixed tolerance; and k=the number of fixed tolerances in the stack.

7. The method of claim 1 wherein said processing calculates tolerances for each dimension to ensure said maximum failure goals and calculates said estimated defect rate for said assembly.

8. A method for determining for a given assembly of parts the defects per assembly or unit (DPU) comprising the steps of:

storing in a processor system first electrical signals representing a mean dimension for each of the parts of the assembly, a sensitivity for each mean dimension, a fixed tolerance for each of the parts of the assembly for which the user cannot change and a standard deviation value for those parts the user can change, and upper and lower specification limit, and processing in a processor said first electrical signals representing mean dimensions, said sensitivity, said tolerance, said upper and lower limits according to the following to produce second electrical signals representing DPU:

$$DPU = (((((((1+0.049867347 * Z_{LT}) + 0.0211410061 * Z_{LT}^2 + 0.0032776263 * Z_{LT}^3 + 0.00003870036 * Z_{LT}^4) + 0.00004889606 * Z_{LT}^5) + 0.000005383 * Z_{LT}^6)^{-16}/2$$

where short term $Z_{ST}$ and long term $Z_{LT}$ standard deviation is calculated according to:

$$Z_{ST} = \frac{\left(P - \sum_{j=1}^{k} S_j \cdot T_{j,f}\right)}{\sqrt{\sum_{j=1}^{m} (s_j \cdot \sigma_j)^2}}$$

$$Z_{LT} = Z_{ST} - 1.5$$

where

P=performance requirement;

k=number of fixed tolerances in a stack;

$s_j$=sensitivity factor of the jth dimension in the stack;

$T_{j,f}$=fixed tolerance;

m=number of variable tolerances in stack; and $\sigma_j$=process standard deviation of the jth dimension in stack;

and displaying said DPU on a display in response to said second electrical signals.

9. A tolerance analysis system for an assembly of parts comprising:

computer storage means for querying a user and in response to user input storing under program control first electrical signals representing a mean dimension for each part of said assembly, a sensitivity for each dimension, a fixed tolerance for each part for which the user cannot change and a standard deviation for those parts for which the user can change, and upper and lower specification limits, computer processor means for processing said first electrical signals representing mean dimensions, said sensitivity, said tolerances and said standard deviation and said limits to calculate tolerances for each dimension, calculate an estimated defect rate for the assembly and provide second electrical signals representing modifications to said parts and assembly to meet design goals, and display means responsive to said second electrical signals for displaying said calculated tolerances, standard deviation, estimated defect rate for the assembly, and said modifications.

10. The system of claim 9 wherein said display means and inputs are placed on a spreadsheet and said processed second electrical signals are placed on said spreadsheet.

11. The system of claim 9 wherein said defect rate, or DPU, is calculated according to the following:

$$DPU = (((((((1+0.049867347*Z_{LT})+0.0211410061*Z_{LT}^2+ \\ 0.0032776263*Z_{LT}^3+0.00003870036*Z_{LT}^4)+ \\ 0.00004889606*Z_{LT}^5)+0.000005383*Z_{LT}^6)^{-16}/2$$

where short term $Z_{ST}$ and long term $Z_{LT}$ standard deviation is calculated according to:

$$Z_{ST} = \frac{\left(P - \sum_{j=1}^{k} S_j \cdot T_{j,f}\right)}{\sqrt{\sum_{j=1}^{m} (s_j \cdot \sigma_j)^2}}$$

$$Z_{LT} = Z_{ST} - 1.5$$

$$Z_{LT} = Z_{ST} - 1.5$$

where

P=performance requirement;

k=number of fixed tolerances in a stack;

$s_j$=sensitivity factor of the jth dimension in the stack;

$T_{j,f}$=fixed tolerance;

m=number of variable tolerances in stack; and $\sigma_j$=process standard deviation of the jth dimension in stack.

12. The system of claim 9 wherein said processing is based on worst case according to $$\Delta_{wc} = 6 \sum_{j=1}^{m} (s_j \cdot \sigma_j) - \left(P - \sum_{j=1}^{k} (s_j \cdot T_{j,f})\right)$$

where $s_j$=sensitivity factor of the jth dimension in a stack;

$\sigma_j$=process standard deviation of the jth dimension in the stack;

k=the number of fixed tolerances in the stack;

P=performance requirement;

$T_{j,f}$=fixed tolerance; and m=number of variable tolerances in the stack.

13. The system of claim 9 wherein said processing is according to statistical allocation and processing is according to:

$$\Delta_{st} = 6\sqrt{\sum_{j=1}^{m} (s_j \cdot \sigma_j)^2} - \left(P - \sum_{j=1}^{k} (s_j \cdot T_{j,f})\right)$$

where m=number of variable tolerances in stack;

$s_j$=sensitivity factor of the jth dimension in the stack;

$\sigma_j$=process standard deviation of the jth dimension in the stack;

$T_{j,f}$=fixed tolerance; and k=the number of fixed tolerances in the stack.

14. A method for assembling parts using a computer to achieve a given maximum failure goal, comprising:

generating in said computer an interactive spreadsheet with an area for inputting by a user a mean dimension for each of said parts of said assembly, an area for inputting sensitivity for each mean dimension, an area for inputting fixed tolerances a user cannot change, an area for inputting standard deviation for those parts that can be changed and an area for inputting upper and lower specification limits;

displaying said spreadsheet in a display for a user to input in said areas said mean dimension, said sensitivity, said fixed tolerances, said standard deviation and said upper and lower specification limits;

storing in a computer storage in response to user inputs inputted first electrical signals representing mean dimension for each of said parts, inputted sensitivity for each mean dimension, inputted fixed tolerance, inputted standard deviation and inputted upper and lower specification limits;

processing in a processor of said computer inputted first electrical signals representing mean dimension, sensitivity, fixed tolerances, standard deviation and upper and lower limits specification limits to provide second electrical signals representing modifications to said parts and assembly to achieve said goal; and changing said parts and assembly on said display to correspond to said second electrical signals representing modifications.

15. The method of claim 14 wherein said processing is based on worst case allocation.

16. The method of claim 15 wherein said processing is according to $$\Delta_{wc} = 6 \sum_{j=1}^{m} (s_j \cdot \sigma_j) - \left( P - \sum_{j=1}^{k} (s_j \cdot T_{j,f}) \right)$$

where $s_j$=sensitivity factor of the jth dimension in a stack;

$\sigma_j$=process standard deviation of the jth dimension in the stack;

k=the number of fixed tolerances in the stack;

P=performance requirement;

$T_{j,f}$=fixed tolerance; and m=number of variable tolerances in stack.

17. The method of claim 15 wherein said processing calculates tolerances for each dimension to ensure equal productivity.

18. The method of claim 14 wherein said processing is according to statistical allocation.

19. The method of claim 18 wherein said processing is according to $$\Delta_{st} = 6 \sqrt{\sum_{j=1}^{m} (s_j \cdot \sigma_j)^2} - \left( P - \sum_{j=1}^{k} (s_j \cdot T_{j,f}) \right)$$

where m=number of variable tolerances in stack;

$s_j$=sensitivity factor of the jth dimension in the stack;

$\sigma_j$=process standard deviation of the jth dimension in the stack;

$T_{j,f}$=fixed tolerance; and k=the number of fixed tolerances in the stack.

20. A tolerance analysis system for assembling parts using a computer to achieve a given maximum failure goal, comprising:

means for generating in said computer an interactive spreadsheet with an area for inputting a mean dimension for each of said parts of said assembly, an area for inputting sensitivity for each mean dimension, an area for inputting fixed tolerances a user cannot change, an area for inputting standard deviations for those parts that can be changed and an area for inputting upper and lower specification limits;

a display coupled to said computer for displaying said spreadsheet for a user to input in said areas said mean dimension, said sensitivity, said fixed tolerance, said standard deviation and said upper and lower specification limits;

a keyboard;

a storage of said computer for storing inputted first electrical signals representing keyed input by said user using a keyboard mean dimension for each of said parts, inputted sensitivity for each mean dimension, inputted fixed tolerances, inputted standard deviations and inputted upper and lower specification limits;

a processor of said computer responsive to said inputted first electrical signals representing mean dimension, sensitivity, fixed tolerance, standard deviation and upper and lower limits specification limits for processing said inputs to provide second electrical signals representing modifications to said parts and assembly to achieve said goal; and said display responsive to said second electrical signals representing modifications for changing said parts and assembly on said display.

* * * * *